United States Patent Office 3,639,530
Patented Feb. 1, 1972

3,639,530
HIGH TENACITY RESINOUS PACKAGING STRAP
Daniel J. Ryan, Chester, Pa., assignor to
FMC Corporation, Philadelphia, Pa.
Original application May 27, 1965, Ser. No. 459,165.
Divided and this application May 22, 1969, Ser. No. 852,957
Int. Cl. C08f 29/12
U.S. Cl. 260—897 B                               4 Claims

ABSTRACT OF THE DISCLOSURE

A high tenacity packaging strap of a monoaxially oriented mixture of isotactic polypropylene and a small amount of a metal ionized alpha-olefin/unsaturated carboxylic acid copolymer.

---

Figure 1:
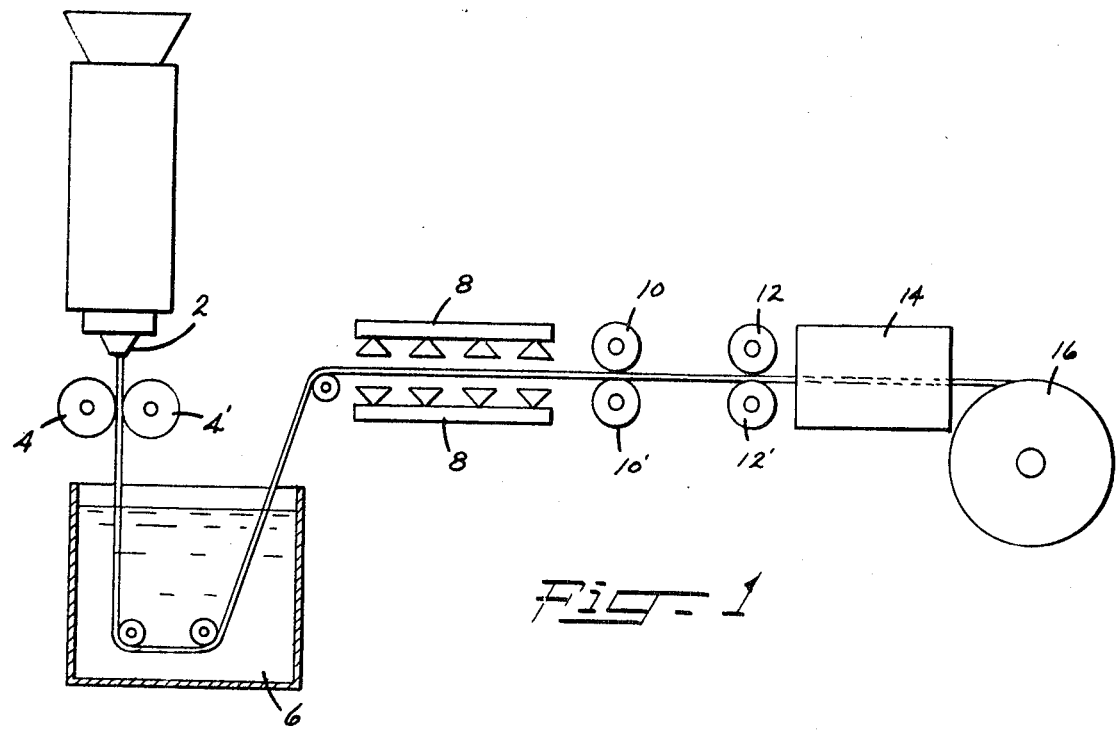

This application is a division of my co-pending application Ser. No. 459,165, filed May 27, 1965, now abandoned.

This invention relates to a resinous composition and stretched articles prepared from said composition having improved tensile strength.

Isotactic polypropylene, in the form of shaped articles, may be stretched to provide considerably higher tensile strength and reduced elongation characteristics. For some applications, such as filaments, fibers, strap and film, it may be desirable to increase the strength of the article above that which may be obtained by conventional stretch orientation methods.

Isotactic polypropylene reaches a maximum tensile strength on stretching to a given degree. On continued stretching, the strength of the material falls off quite drastically. Thus, additional stretching of an isotactic polypropylene article over a given amount will not serve to provide increased strength but, in fact, will produce a deleterious result.

It is an object of this invention to provide a resinous composition principally containing isotactic polypropylene which is capable of providing articles of extremely high strength.

It is another object of this invention to provide stretched articles of isotactic polypropylene which have improved tensile strength.

It is still another object of this invention to provide an isotactic polypropylene packaging strap having a tensile strength approaching that of steel packaging strap.

It is still another object of this invention to provide an isotactic polypropylene packaging strap having a tensile strength approaching that of steel packaging strap.

These and other objects are accomplished in accordance with this invention with a homogeneous mixture of from at least about 80 wt. percent of a substantially isotactic resin selected from the group consisting of polypropylene and a copolymer of at least about 95 wt. percent of propylene and ethylene, and at least about 5 wt. percent of a resinous copolymer of from about 93 to 99 mol percent of an alpha-olefin having 2 to 3 carbon atoms and from 7 to 1 mol percent of an ethylenically unsaturated aliphatic carboxylic acid having from about 3 to 8 carbon atoms, said copolymer having from about 20 to about 90% of its carboxyl groups ionized with a metal selected from the group consisting of metals from Groups I, II, III and IV of the Periodic Table.

In a preferred embodiment, the composition comprises a homogeneous mixture of about 88 to about 92 wt. percent of a substantially isotactic polypropylene, and from about 12 to about 8 wt. percent of a resinous copolymer of about 96 to about 97 mol percent of ethylene and from about 4 to about 3 mol percent of an acid selected from the group consisting of acrylic and methacrylic acids, said copolymer having from about 50 to about 80% of its carboxyl groups ionized with a metal selected from the group consisting of metals from Groups I, II, III and IV of the Periodic Table.

The article of this invention broadly comprises a stretched resinous material comprising the homogeneous mixture as broadly described above. In its preferred form, the article is a uniaxially oriented isotactic polypropylene strap homogeneously containing from about 8 to about 12 wt. percent of the copolymer as described in the above-mentioned preferred composition.

An additional facet of the invention concerns a method of preparing a high tenacity elongated article which comprises melt extruding the homogeneous composition as described herein in the form of an elongated shaped article, cooling the extruded article, and thereafter longitudinally stretching the article at a draw ratio of from 9 to 13. The "draw ratio" indicates the multiple of length that the article is stretched compared to its original length.

In a preferred method, as shown in the accompanying drawing at FIG. 1, the preferred homogeneous resin composition of this invention is melt extruded through a rectangular orifice 2. The formed article is then quickly passed through the nip of a pair of cold quenching rolls 4 and 4', cooled by passing it through a cooling water bath 6, heated to a temperature of between 140 and 300° F. in zone 8, stretched at a draw ratio of between 9 and 13 as between draw rolls 10–10' and 12–12', and thereafter cooled as in zone 14. The stretched article is then wound up on roll 16. In the preferred form, the stretched article is a packaging tape or strap having a thickness of at least 10 mils.

The substantially isotactic polypropylene and copolymer of at least 95 wt. percent propylene and ethylene are resins which, in general, have a softening range of about 110 to 140° C., a density in g./cc. of about 0.600 to 0.925 as measured at 23° C. by ASTM D792–50, and a molecular weight ranging from about 50,000 to about 500,000. The term "isotactic" as used with respect to resinous polymers is defined in U.S. Pat. 2,882,263.

The resinous copolymer component of the mixture is prepared from an alpha olefin, which is either ethylene or propylene, and an ethylenically unsaturated aliphatic carboxylic acid or lower alkyl esters thereof, e.g. where the alkyl group has from 1 to 6 carbon atoms. The acid component of the copolymer includes a monocarboxylic or dicarboxylic acid having from 3 to 8 carbon atoms, for example, acrylic, methacrylic, ethacrylic, fumaric, maleic, itaconic, crotonic and like acids.

Copolymerization is carried out in a conventional manner, for example, by employing a free radical initiator in the presence of an inert solvent at elevated temperature and pressure. If a lower alkyl ester of the acid is used in the copolymerization process, the copolymer is further treated to remove the ester groups as by heat decomposition or hydrolysis to leave the carboxyl groups intact.

A proportion of the carboxyl groups on the copolymer chain are ionized with a metal which is a member of Groups I, II, III or IV of the Periodic Table as set forth, for example, on p. 368 of Text-Book of Inorganic Chemistry—Partington, sixth edition. The more important metals of these groups include lithium, sodium, potassium, magnesium, zinc, aluminum and tin, and of these, the alkali metals are preferred.

Ionization of the carboxyl groups to form metal carboxylates is brought about by replacement of the hydrogen ion with a metallic ion. For example, during basic hydrolysis of the ester groups, formed when the alpha-olefin is copolymerized with a low alkyl ester of the carboxylic acid, metal ions from the basic reagent from metal carboxylates. Some of these metal carboxylates may be neutralized to obtain the desired number of carboxyl groups. Another method of ionizing the carboxyl groups with a metal is to react the carboxyl groups on the copolymer chain with polyvalent metal oxides to the desired number of metal carboxylate groups. Any method of converting a given proportion of the carboxyl groups to metal carboxylates is suitable.

The alpha olefin-carboxylic acid copolymer having a given proportion of its carboxyl groups ionized with a metal has been termed an "ionomer" as reported in the Polymer Preprints of the American Chemical Society, vol. 6, April 1965, pp. 287–303. The term is used to designate a polymer containing both organic and inorganic materials linked by both covalent and ionic bonds. The ionic bonds are positively and negatively charged groups which are disassociated from each other. The negatively charged or anionic groups hang from the polymer chain as carboxyl groups while the positively charged or cationic groups are metallic in nature. Thus, there are both ionized and free carboxyl groups present in the "ionomer."

The composition of this invention may be compounded with up to about 20 wt. percent of blend components and additives for improving various polymer characteristics and for coloring.

Figure 2:
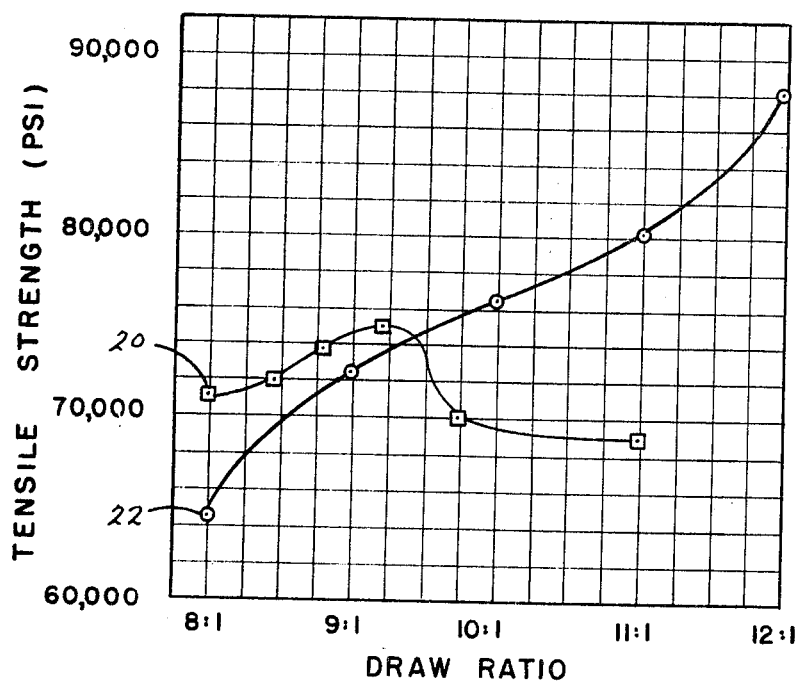

FIG. 2 of the accompanying drawing is a graph of polymer tensile strength with increasing stretch. Square marked points 20 represent the tensile strength curve for isotactic polypropylene containing one part of coloring pigment for each 9 parts of resin. Circle marked points 22 represent the strength curve for a homogeneous mixture of 9 parts isotactic polypropylene, 1 part coloring pigment and 1 part of the copolymer of 96.5 mol percent of ethylene and 3.5 mol percent of methacrylic acid wherein 80% of the carboxyl groups have been ionized with potassium.

It is apparent that the straight isotactic polypropylene reaches a strength peak at a draw ratio of slightly over 9 while the mixed isotactic polypropylene and copolymer resin, although having a reduced strength at lower draw ratios, approaches the strength of the straight resin at its peak and then continues upwardly with increased stretch to almost 90,000 p.s.i. at a draw ratio of 12. This material approaches the strength of steel used for packaging strap and bundling which begins at about 90,000 p.s.i.

The inclusion of the coloring pigment is necessary for commercially acceptable packaging strap and has no appreciable effect on tensile strength of the material.

I claim:

1. An article of manufacture comprising a packaging strap which has been uniaxially oriented in the longitudinal direction at a draw ratio of at least about 10 and is at least 10 mils thick consisting essentially of a homogeneous mixture of from at least about 80 weight percent of a substantially isotactic resin consisting of polypropylene or a copolymer of at least 95 mol percent of propylene and ethylene, and at least about 5 weight percent of a resinous ionic copolymer of from about 93–99 mol percent of an alpha-olefin having 2 to 3 carbon atoms and from 7 to 1 mol percent of an ethylenically unsaturated aliphatic carboxylic acid having from 3 to 8 carbon atoms, said resinous ionic copolymer having about 20 to 90 percent of its carboxyl groups ionized with a metal selected from Groups I, II, III and IV of the Periodic Table, said strap having a tensile strength ranging from about 76,000 up to about 90,000 p.s.i.

2. The article of claim 1 wherein the substantially isotactic resin is polypropylene which is present in the homogeneous mixture in an amount ranging from about 88 to about 92 wt. percent.

3. The article of claim 1 wherein the alpha-olefin is ethylene and the aliphatic carboxylic acid is acrylic or methacrylic acid.

4. The article of claim 1 wherein the ionizing metal is an alkali metal.

References Cited

UNITED STATES PATENTS

| 3,324,217 | 6/1967 | Armstrong et al. | 269—210 |
| 3,264,272 | 8/1966 | Rees | 260—78.5 |

FOREIGN PATENTS

| 87,132 | 9/1964 | India | 260—897 |

MURRAY TILLMAN, Primary Examiner
C. J. SECCURO, Assistant Examiner

U.S. Cl. X.R.

264—210

PO-1050
(5/69)

UNITED STATES PATENT OFFICE
CERTIFICATE OF CORRECTION

Patent No. 3,639,530      Dated February 1, 1972

Inventor(s) Daniel J. Ryan

It is certified that error appears in the above-identified patent and that said Letters Patent are hereby corrected as shown below:

Col. 1, lines 52 & 53, delete "an isotactic - strap." and substitute therefore -- a method of manufacturing elongated isotactic polypropylene articles having improved tensile strength.-- Col. 3, line 1, "from" should read --form--.

Signed and sealed this 27th day of June 1972.

(SEAL)
Attest:

EDWARD M. FLETCHER, JR.
Attesting Officer

ROBERT GOTTSCHALK
Commissioner of Patents